UNITED STATES PATENT OFFICE.

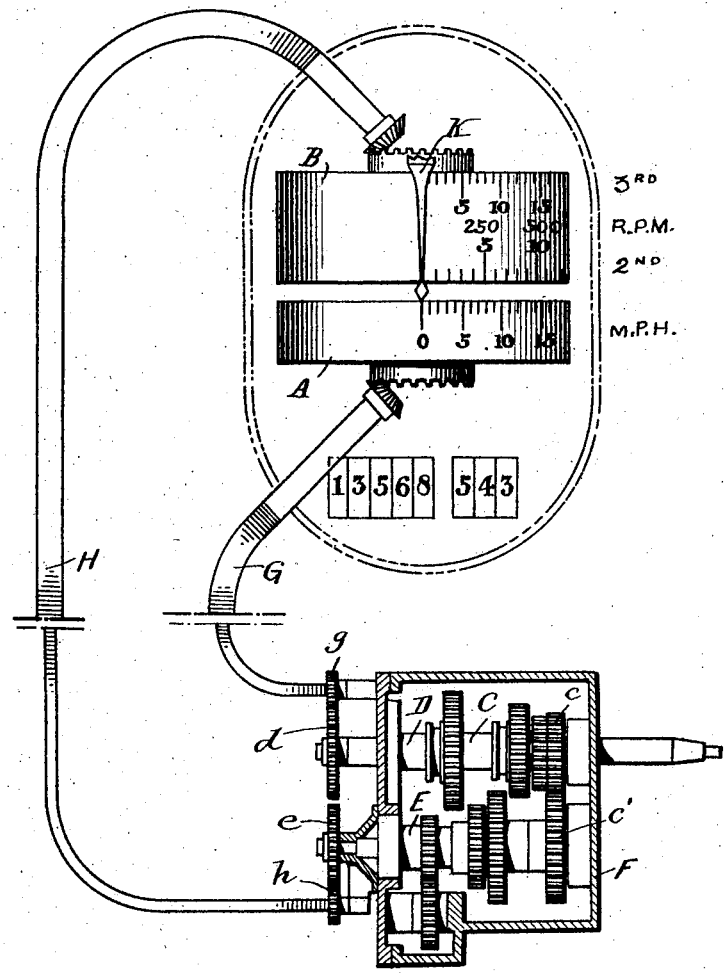

THOMAS FARMER, JR., OF NEW YORK, N. Y.

SPEED INDICATOR.

1,417,049.    Specification of Letters Patent.    Patented May 23, 1922.

Application filed August 21, 1919. Serial No. 319,021.

*To all whom it may concern:*

Be it known that I, THOMAS FARMER, Jr., a citizen of the United States, residing at New York city, borough of Manhattan, in the county of New York and State of New York, have invented certain new and useful Improvements in Speed Indicators, the following being a full, clear, and exact disclosure of the one form of my invention which I at present deem preferable.

For a detailed description of the present form of my invention, reference may be had to the following specification and to the accompanying drawing forming a part thereof.

My invention relates to speed indicators designed to show the synchronous speed of two shafts which it is desired to connect together in a certain gear ratio, and it consists of adjacent speedometers driven respectively by the shafts that are to be connected, the graduation on the speedometer of one shaft being equal to that of the other shaft multiplied by the gearing ratio. Thereby the two speedometers will show the same figure at a time when their relative speeds are in the correct ratio. In general one speedometer represents the speed of its driving shaft but the other represents the speed of its driving shaft multiplied by a factor corresponding to the speed relation of the two shafts. I have illustrated my invention by speed indicators applied respectively to the jack shaft and the propeller shaft of an automobile.

These two shafts are at certain times to be connected in the intermediate gear ratio. Since the former shaft then has the higher speed, its speedometer is provided with graduations which correspond to those of the propeller-shaft speedometer multiplied by the intermediate gear ratio. Thereby both speedometers will show the same figure—say five miles per hour on the propeller speedometer—when their relative speeds are in the gearing ratio. I also show a second set of graduations indicating, on the same principle, the synchronism of the propeller shaft and clutch shaft.

Referring to the accompanying drawing, D represents the propeller-shaft and E the jack-shaft of an ordinary transmission gearing of an automobile. C is the clutch-shaft which is permanently geared to the jack-shaft in a fixed ratio by the wheels *c* and *c'*. F is the gear case. The propeller-shaft, by means of the gears *d*, *g*, and flexible shaft G, drives a speed indicator A and a similar adjacent indicator B is driven by the jack-shaft through gears *e*, *h* and flexible shaft H. These two speedometers may be of any desired kind, such as are now well known on automobiles provided they are of the vibrating type such as I have indicated in my drawing. In practice I am employing the well-known speedometer of the Waltham Watch Company, (Tesla Patent No. 1,209,359,) which it is not necessary to illustrate, but which, it may be said, has its vibrating member operated in one direction by a spring and in the opposite direction by the air-film drag of a continuously rotating member driven usually from the propeller shaft. K is a stationary marker under which move the graduations on the respective speedometers.

The graduations on A indicate, as usual, the vehicle speed—say from zero to 80 M. P. H. On B, however, the graduations on the lower edge of the scale are wider than those on A, in a ratio proportional to the gear ratio of the two shafts when engaged for intermediate gearing. Hence, if both scales indicate—say five, it means that the propeller-shaft has a speed corresponding to a vehicle speed of five M. P. H. but that the jack-shaft has a speed higher than that of the propeller-shaft in the ratio of the calibration widths, which is also the speed ratio of the two shafts when the teeth of the intermediate gears are at synchronous speed. So at that time the gears may be engaged without clashing. Assume that the car has been started on low gear, the jack-shaft indicator then showing a much higher figure than the car speed, and it is desired to shift to intermediate. The clutch is opened, the gears disengaged, and the spinning jack-shaft slows down rapidly until its scale shows the same figure under the marker that the propeller-shaft shows, then it is apparent that, with respect to that particular vehicle speed, the jack-shaft speed has a ratio corresponding to the intermediate gear ratio—e. g. 1.6—and so the intermediate gears may be safely put into mesh.

On the upper edge of speedometer B is another set of graduations which are also artificial, not representing the speed of the jack-shaft which drives the speedometer, but the speed of the clutch-shaft (to which the jack-shaft is permanently geared) in terms of the vehicle speed. That is, of course, due to the fact that the clutch-shaft is to be connected directly to the propeller-shaft for the "high" condition. In this case also the jack-shaft indicator does not represent the jack-shaft speed, but represents that speed multiplied by a factor corresponding to the speed ratio of the two shafts, that factor now being the gear ratio between the jack-shaft and the clutch-shaft which is to engage the propeller-shaft and therefore must show the same speed as the propeller-shaft when it is in condition to engage it. In this case the computation aforesaid makes the graduations of the same width as those of the indicator A. It is apparent that additional graduations may be added for additional gearing ratios and also that the speedometer B might be operated by the clutch instead of the jack-shaft with appropriate corrections for the permanent gear relation between them. Moreover while I have shown the indicator A as driven directly by the propeller shaft, it may be equivalently driven by a wheel or other rotary part that will similarly represent the vehicle speed. An important advantage in my present apparatus is that the same marker which shows vehicle speed may also be used to show the synchronism of the parts which are to be engaged in shifting the gears. That eliminates the confusion which is liable to occur when a multiplicity of indications are to be read from the same instrument. It moreover greatly simplifies the mechanical construction of the duplex indicator.

What I claim as new and desire to secure by Letters Patent is:

1. The combination of two shafts arranged to be disengaged and reengaged with respect to each other, and two adjacent vibrating speed indicators driven by the respective shafts, one indicator being graduated to represent the speed of its driving shaft and the other to represent the speed of its driving shaft multiplied by a factor corresponding to the gearing relation between the two shafts.

2. The combination with two rotary shafts of two adjacent indicators driven by the respective shafts and a stationary marker with respect to which both indicators are graduated.

3. The combination with two rotary shafts arranged to operate at different speeds, two vibrating speedometers driven by the respective shafts and a stationary marker with respect to which both indicators are graduated, one of them directly and the other by a multiplying factor corresponding to the speed ratio of the two shafts.

4. The combination with two rotary shafts arranged to run at different speeds, of two speed indicators driven by the shafts respectively and a common marker, the two indicators having differently spaced graduations corresponding to the speed difference between the two shafts.

Signed at New York, county and State of New York, this 19th day of August, 1919.

THOMAS FARMER, Jr.